United States Patent [19]

Beck

[11] Patent Number: 5,299,858
[45] Date of Patent: Apr. 5, 1994

[54] BRAKE SYSTEM WITH A DEVICE FOR CONTROLLING BOTH THE BRAKE SLIP AND THE TRACTION SLIP

[75] Inventor: Erhard Beck, Weilburg, Fed. Rep. of Germany

[73] Assignee: Alfred Teves GmbH, Frankfurt am Main, Fed. Rep. of Germany

[21] Appl. No.: 960,411

[22] PCT Filed: Feb. 20, 1992

[86] PCT No.: PCT/EP92/00357
§ 371 Date: Dec. 18, 1992
§ 102(e) Date: Dec. 18, 1992

[87] PCT Pub. No.: WO92/18363
PCT Pub. Date: Oct. 29, 1992

[30] Foreign Application Priority Data

Apr. 19, 1991 [DE] Fed. Rep. of Germany ....... 4112821

[51] Int. Cl.$^5$ .............................. B60T 8/32; B60T 8/48; B60K 28/16
[52] U.S. Cl. ................ 303/113.2; 303/116.1; 303/119.1; 303/111
[58] Field of Search ............ 303/116.1, 113.2, 113.3, 303/119.1, 116.2, 111, 92, 6.01, 110, 116.4, 116.3; 180/197; 188/181 R, 181 A

[56] References Cited

U.S. PATENT DOCUMENTS

| 5,152,586 | 10/1992 | Burgdorf | 303/116.1 X |
| 5,178,442 | 1/1993 | Toda et al. | 303/111 X |
| 5,234,264 | 8/1993 | Willmann et al. | 303/113.2 |

FOREIGN PATENT DOCUMENTS

| 0376788 | 7/1990 | European Pat. Off. . |
| 3439408 | 7/1986 | Fed. Rep. of Germany . |
| 3832023 | 3/1990 | Fed. Rep. of Germany . |
| 2601636 | 1/1988 | France . |
| 2218480 | 11/1989 | United Kingdom . |

*Primary Examiner*—Douglas C. Butler
*Attorney, Agent, or Firm*—Robert P. Seitter; J. Gordon Lewis

[57] ABSTRACT

A brake system based on the recirculation principle and having a self-priming pump which operates for both anti-lock control and traction slip control. The pump self-primes from the pressure medium storage reservoir via the master cylinder for traction slip control. In a diagonal brake circuit arrangement, a vacuum is prevented from forming in the wheel brake of the non driven wheel because two non-return valves and an auxiliary line are provided which, with the traction-slip-control shut-off valve closed, only permit pressure medium to be supplied to the wheel brake of the non-driven wheel from the suction side of the pump, whereas pressure medium removal only can take place towards the delivery side of the pump.

8 Claims, 1 Drawing Sheet

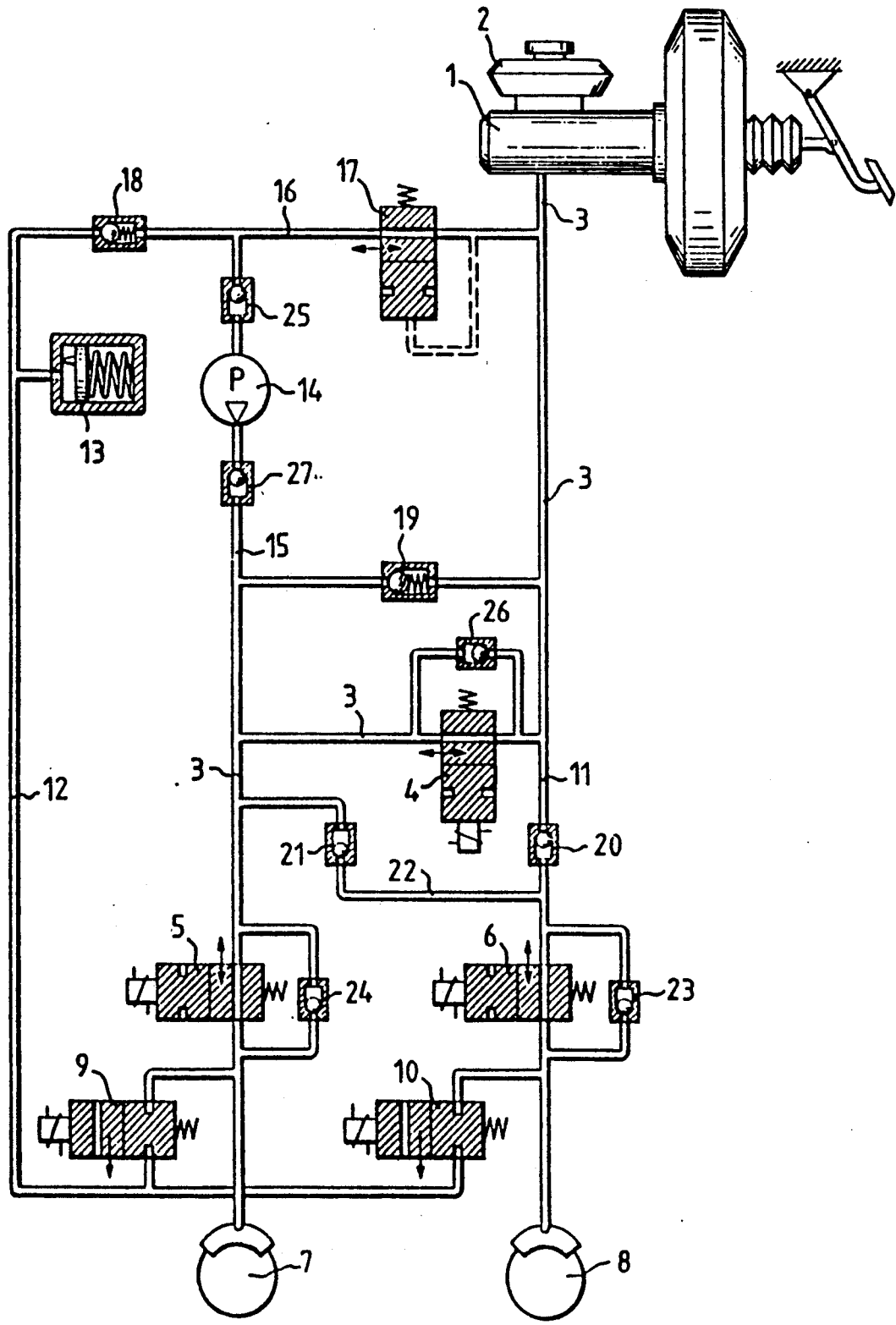

BRAKE SYSTEM WITH A DEVICE FOR CONTROLLING BOTH THE BRAKE SLIP AND THE TRACTION SLIP

BACKGROUND OF THE INVENTION

The present invention relates, in general, to vehicle braking systems and, in particular, to a brake system for controlling both brake slip and traction slip.

German Patent Application DE 38 32 023 A1 describes a generic anti-lock-controlled brake system working in accordance with the recirculation principle. The pump is of the self-priming type in order to be able to supply pressure medium from the pressure medium storage reservoir through the brake line, via the tandem master cylinder, into the wheel brake of the spinning wheel for the purpose of traction slip control However, a vacuum must be prevented from forming in the wheel brake due to the self-priming action of the pump. To this end, a non-return valve opening in the direction of suction is built into the return line of the wheel brake which leads to the suction side of the pump, the pre-pressure of this non-return valve being at least as high as the atmospheric pressure.

If the brake circuit is arranged so that only the wheel brakes of driven and non-driven wheels are, at a particular time, in one brake circuit, (i.e. the so-called black-and-white arrangement) or an all-wheel drive, the problem is thus solved. The situation, however, is different with a brake system of the diagonal type when the vehicle has a one-axle drive. Then either brake circuit will operate on one brake of a driven wheel and one brake of a non-driven wheel at a time. In case of traction slip control, on the one hand, pressure should be built up only in the brake cylinders of driven wheels. On the other hand, it is also necessary to protect the brakes of the non-driven wheels from a vacuum. If, during a traction slip control operation, the pump primes through the brake line and the tandem master cylinder, it will generate a vacuum of about 0.8 bar. Depending on the throttling effects which appear between the reservoir and the connection of the suction line to the brake line, this vacuum may propagate, weakened, as far as the brake of the non-driven wheel if the shut-off valve is located between the feed lines to the wheel brakes of the driven wheel and of the non-driven wheel. However, if the two wheel brakes are located, relative to the master cylinder, beyond the shut-off valve, then the brake of the non-driven wheel would also be applied during traction slip control A complicated circuit logic, closing the corresponding inlet valve during traction slip control, is comparatively intricate and expensive If the shut off valve is arranged between the brake feed lines, closing of the inlet valve, as a rule, will be of no avail because, generally, non-return valves are connected in parallel to the inlet valves, with the non-return valves opening in the outlet directions and, thus, similarly permitting the formation of a vacuum.

SUMMARY OF THE INVENTION

It is thus an object of this invention to protect, in a reliable manner, the brakes of the non-driven wheels from vacuum and pressure-build during traction slip control without using any additional auxiliary means.

This object is achieved, according to the present invention, by a particular arrangement of the brake of the non-driven wheel and two non-return valves. In case of traction slip control, because of the shut-off valve between the feed lines leading to the inlet valves, only the brake of the driven wheel will be filled by the pump pressure, without the inlet valves being actuated The wheel brake of the non-driven wheel can only be filled via its feed line which, relative to the shut-off valve, is on the master-cylinder side, (i.e., only during a pedal-operated braking operation). Pressure medium reduction is effected via an auxiliary line leading to the delivery side of the pump. No vacuum can form on this side of the shut-off valve. The wheel brake of the non-driven wheel will also be protected even if, for safety reasons, non-return valves are provided in parallel to the inlet valves, which, generally, is the case.

BRIEF DESCRIPTION OF THE DRAWING

Further advantageous characteristics of this invention will become evident from the following description of a preferred embodiment, with reference being made to the circuit diagram shown in the single figure.

DETAILED DESCRIPTION OF THE INVENTION

Brake line 3 leads from the master cylinder 1 which is fed by the pressure medium storage reservoir 2 and pressure medium is conducted through the shut-off valve 4 to the inlet valve 5 of the wheel brake 7 of a driven wheel. Upstream of the shut-off valve 4, the branch line 11 branches off leading to the inlet valve 6 of the wheel brake 8 of a non-driven wheel Return line 12 leads from the outlet valves 9 and 10 of the wheel brakes 7 and 8. The outlet valves are operated for braking pressure control Return line 12 extends to the low-pressure accumulator 13 and, thence, to the suction side of the pump 14. From the pump, the pressure line 15 extends, via the pressure valve 27, to the brake line 3 and ends in the brake line 3 on that side of the shut-off valve 4 which is away from the master cylinder 1.

For traction slip control, the pump is provided with a suction line 16 leading from the brake line 3 to the suction side of the pump. Suction line 16 branches off between the master cylinder 1 and the shut-off valve 4 and is provided with the suction control valve 17.

The suction valve 18 and a pressure relief valve 19 are provided for specific safety measures. The suction valve 18 has a pre-pressure of more than 1 bar and prevents a vacuum from forming in the return line 12. The pressure exceeding the braking pressure to be generated for traction slip control, (i.e., approximately between 60 bar and 160 bar). This takes care of relieving the lines by discharging pressure medium into the master cylinder 1 should an excessive pump pressure accumulate.

The non-return valve 20 and the auxiliary line 22, with the non-return valve 21 arranged therein, are included as new additional elements in this circuitry. Their purpose will be explained with reference to the following description of the mode of operation of this brake system.

For a pedal-operated braking operation, when the brake slip remains within permissible limits, the control valves 4, 5, 6, 9, 10 and 17 will remain in their illustrated basic positions. The suction control valve 17 will be closed by the master cylinder pressure. The suction control valve, which will be open when pressureless, permits the pump to prime from the tandem master cylinder at all times except for the times when the driver will be applying the brake. However, instead of using this valve, it is also possible to use a valve which will be closed when pressureless and which will be opened by the pump-side vacuum, such as a valve which will be activated mechanically, (e.g., via the brake pedal travel, or an electromagnetically operated "SO" valve which will be open when currentless or an electromagnetically operated "SG" valve which will be closed when currentless). For a normal braking operation, the pressure in the wheel brakes will be built up and removed again via the inlet valves 5 and 6.

If there is danger of lock-up of any wheel brake, pressure medium can be discharged, in the known manner, into the low-pressure accumulator via the outlet valves 9 and 10 and resupplied from the accumulator to the brake line 3 by means of the pump 14.

The operations just described can be performed by state of the art units as well as by the brake system of the present invention.

For traction slip control, (i.e., when a driven wheel is braked without the pedal being operated) the situation is different. The master cylinder I and the lines will be pressureless. The suction control valve 17 will thus remain in its open basic position so that the pump 14 will be able to prime from the pressure medium storage reservoir 2 via the brake line 3 and the master cylinder 1 and to supply pressure medium into the brake line 3 via the pressure line 15. In this operation, the shut-off valve 4 will be closed so that only the wheel brake 7 of the driven wheel will be filled and any return flow of the pressure medium into the master cylinder 1 will be blocked.

With the suction line 16 of the pump 14 connected to the brake line 3, a vacuum might form in the wheel brake 8 but for the arrangement of the non-return valve 20 because the non-return valve 23, connected in parallel to the inlet valve 6, opens in the outlet direction so that even closing of the inlet valve 6 would provide no remedy. As to wheel brake 7, the non-return valve 24 does not present such a danger because it is located on the delivery side of the pump.

The non-return valve 20 in the branch line 11 only enables a filling of the wheel brake from the side of the shut-off valve 4 which faces the master cylinder 1. For the purpose of pressure removal, the new auxiliary line 22 is included towards the delivery side of pump 14. The non-return valve 21 is included to prevent the shut-off valve 4 from being rendered ineffective. During traction slip control, the pressure in the wheel brake 7 will be controlled via the inlet valve 5 and the outlet valve 9.

To prevent the pressure in the wheel brake 7 from dropping below atmospheric even with an open outlet valve 9, the suction valve 18 has a pre-pressure of slightly more than 1 bar. The non-return valve 25, in contrast, will open as early as a pressure difference of approximately 0.2 bar is developed so that the pump will be able to prime from the unpressurized pressure medium reservoir 2.

The non-return valve 26 is connected in parallel to the shut-off valve 4 to ensure that, during traction slip control, (i.e. with the shut-off valve 4 closed), a sudden pedal-initiated braking operation that possibly might come up will also actuate the wheel brake 8.

| LIST OF REFERENCE NUMERALS | |
|---|---|
| 1 | master cylinder |
| 2 | pressure medium storage reservoir |
| 3 | brake line |
| 4 | shut-off valve |
| 5 | inlet valve |
| 6 | inlet valve |
| 7 | wheel brake (driven wheel) |
| 8 | wheel brake (non-driven wheel) |
| 9 | outlet valve |
| 10 | outlet valve |
| 11 | branch line |
| 12 | return line |
| 13 | low-pressure accumulator |
| 14 | pump |
| 15 | pressure line |
| 16 | suction line |
| 17 | suction control valve |
| 18 | suction valve |
| 19 | pressure relief valve |
| 20 | non-return valve |
| 21 | non-return valve |
| 22 | auxiliary line |
| 23 | non-return valve |
| 24 | non-return valve |
| 25 | non-return valve |
| 26 | non-return valve |
| 27 | pressure valve |

I claim:

1. A brake system with a device for controlling both the brake slip and the traction slip, essentially consisting of a master cylinder, of a first wheel brake connected with the master cylinder via a brake line and belonging to a driven wheel, of a self-priming pump whose suction side communicates with a low-pressure accumulator and with a pressure medium storage reservoir via the master cylinder through a suction line connected to the brake line and whose delivery side is connected to the brake line via a pressure line, of at least one suction valve arranged between the first wheel brake and the suction side of the pump and opening towards the pump and having a pre-pressure of at least one bar, of a first inlet valve in the brake line between the point where the pressure line ends in the brake line and the first wheel brake, of an outlet valve via which the first wheel brake is connectible to a return line leading to the low-pressure accumulator, of a shut-off valve in the brake line between the point where the pressure line ends in the brake line and the master cylinder, of a lockable suction control valve in the suction line, characterized in that, by means of a branch line, a second wheel brake belonging to a non-driven wheel is connected to the brake line between the connection of the suction line and the shut-off valve; in that a second inlet valve is provided in the branch line and a first non-return valve opening towards the second wheel brake is arranged between the second inlet valve and the connection of the branch line to the brake line; and in that an auxiliary line runs from the branch line between the first non-return valve and the second inlet valve of the second wheel brake to the rake line between the shut-off valve and the first inlet valve of the first wheel brake, in the auxiliary line a second non-return valve being arranged which opens from the side of the second wheel brake towards the side of the first wheel brake.

2. A brake system as claimed in claim 1, characterized in that the suction control valve is a two-way valve which is open when pressureless and which is hydraulically lockable by the master cylinder pressure.

3. A brake system as claimed in claim 2, characterized in that a non-return valve, opening when there comes pressure from the master cylinder, is arranged in parallel to the shut-off valve.

4. A brake system as claimed in claim 3, characterized in that a pressure relief valve is connected in parallel to the shut-off valve, the pre-pressure of said pressure relief valve being above the braking pressure provided for traction slip control and said pressure relief valve opening towards the master cylinder.

5. A brake system for controlling both brake slip and traction slip, said system comprising:
- a master cylinder;
- a pressure medium storage reservoir in fluid communication with said master cylinder;
- a brake line leading from said master cylinder;
- a first wheel brake connected to said master cylinder through said brake line and associated with a driven wheel;
- a return line;
- a low-pressure accumulator connected into said return line;
- a suction line connected into said brake line;
- a pressure line connected into said brake line;
- a self-priming pump having:
  - (a) a suction side in fluid communication with:
    - (1) said low-pressure accumulator, and
    - (2) said pressure medium storage reservoir through said master cylinder and through said suction line, and
  - (b) a delivery side connected to said brake line through said pressure line;
- a suction valve in said return line between said first wheel brake and said suction side of the pump opening towards said pump and having a pre-pressure of at least one bar;
- a first inlet valve in said brake line between said first wheel brake and the connection of said pressure line into said brake line;
- a outlet valve through which said first wheel brake is connected to said return line;
- a shut-off valve in said brake line between said master cylinder and the connection of said pressure line into said brake line;
- a lockable suction control valve in said suction line between said pump and said master cylinder;
- a branch line connected into said brake line at the connection of said suction line into said brake line;
- a second wheel brake associated with a non-driven wheel and connected to said master cylinder through said branch line and said brake line;
- a second inlet valve in said branch line between said second wheel brake and the connection of said branch line into said brake line;
- a first non-return valve opening towards said second wheel brake between said second inlet valve and the connection of said branch line into said brake line;
- an auxiliary line extending from a point in said branch line between said first non-return valve and said second inlet valve to a point in said brake line between said shut-off valve and said first inlet valve;
- and a second non-return valve in said auxiliary line which opens from the side of said second wheel brake towards the side of said first wheel brake.

6. A brake system according to claim 5 wherein said suction control valve is a two-way valve which is open when pressureless and which is hydraulically lockable by said master cylinder pressure.

7. A brake system according to claim 6 further including a third non-return valve arranged in parallel with said shut-off valve and opening when pressure medium is supplied from said master cylinder.

8. A brake system according to claim 7 further including a pressure relief valve connected in parallel to said shut-off valve, the pre-pressure of said pressure relief valve being above the braking pressure provided for traction slip control and said pressure relief valve opening towards said master cylinder.

* * * * *